Figure 1:
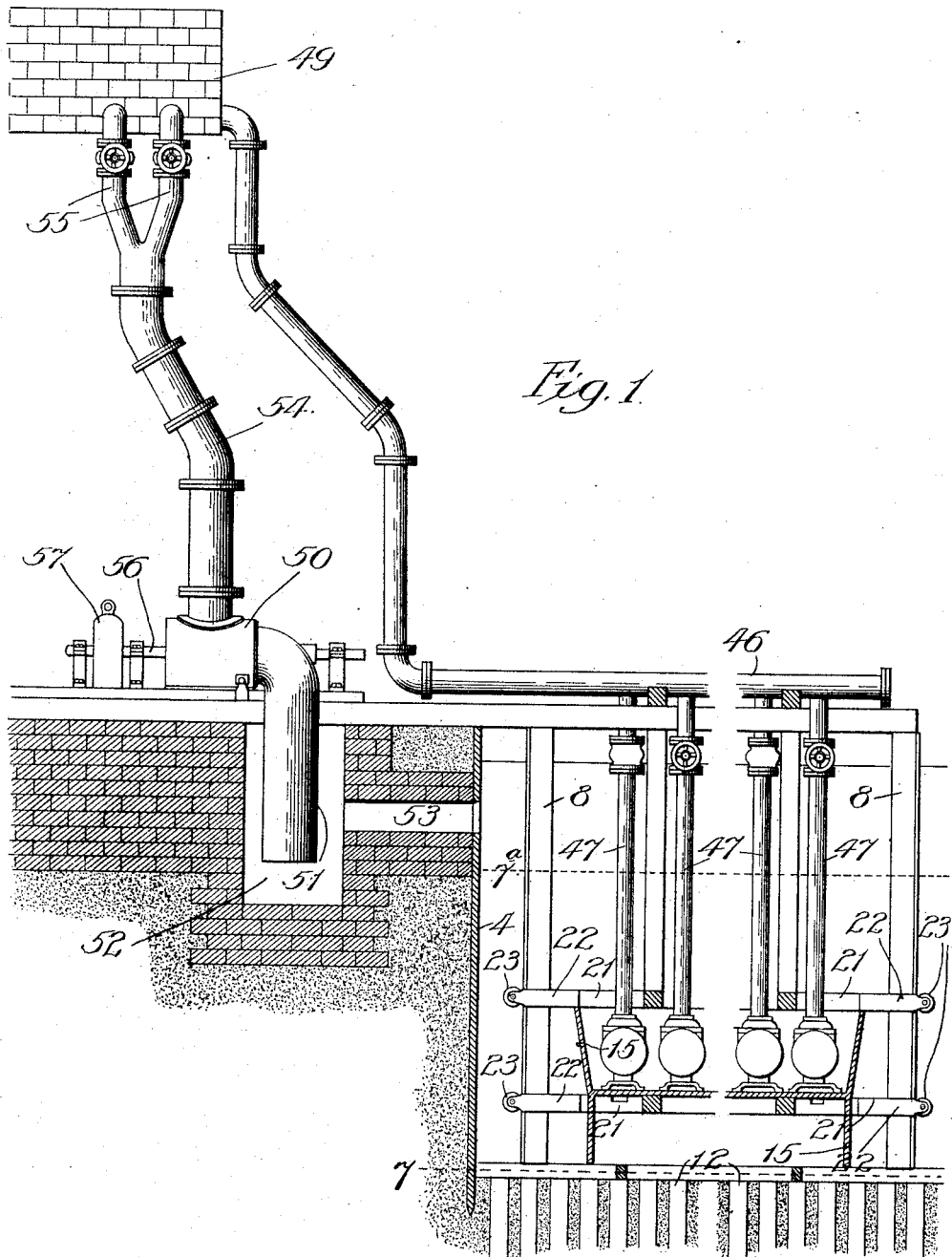

E. L. & M. C. SHARPNECK.
TIDE MOTOR.
APPLICATION FILED JUNE 23, 1909.

975,726.

Patented Nov. 15, 1910.
5 SHEETS—SHEET 1.

Witnesses:
John Enders
Chas. H. Bull

Inventors
Eliel L. Sharpneck &
Matthew C. Sharpneck.
By Dyrenforth, Lee, Chritton & Wiles
Attys.

E. L. & M. C. SHARPNECK.
TIDE MOTOR.
APPLICATION FILED JUNE 23, 1909.

975,726.

Patented Nov. 15, 1910.

5 SHEETS—SHEET 3.

Witnesses:
John Enders
Chas. H. Buell.

Inventors.
Eliel L. Sharpneck &
Matthew C. Sharpneck.
By Dyrenforth, Lee, Chritton & Wiles
Attys.

E. L. & M. C. SHARPNECK.
TIDE MOTOR.
APPLICATION FILED JUNE 23, 1909.

975,726.

Patented Nov. 15, 1910.
5 SHEETS—SHEET 4.

Witnesses:
John Enders
Chas. H. Buell

Inventors:
Eliel L. Sharpneck &
Matthew C. Sharpneck.
By Dyrenforth, Lee, Chritton & Wiles
Attys.

THE NORRIS PETERS CO., WASHINGTON, D. C.

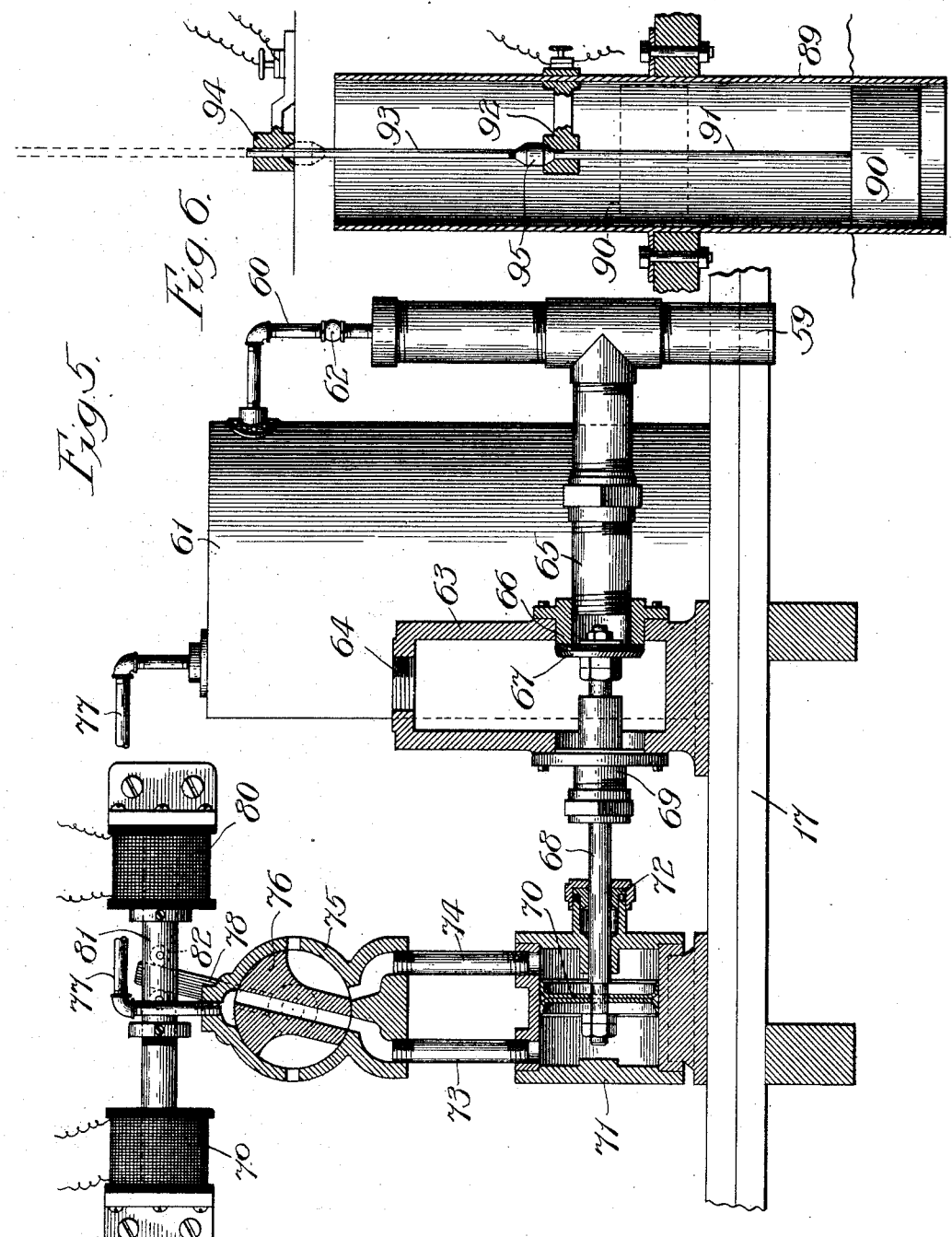

UNITED STATES PATENT OFFICE.

ELIEL L. SHARPNECK AND MATTHEW C. SHARPNECK, OF BOSTON, MASSACHUSETTS.

TIDE-MOTOR.

975,726.

Specification of Letters Patent. Patented Nov. 15, 1910.

Application filed June 23, 1909. Serial No. 503,847.

*To all whom it may concern:*

Be it known that we, ELIEL L. SHARPNECK and MATTHEW C. SHARPNECK, citizens of the United States, residing at Boston, in the county of Suffolk and State of Massachusetts, have invented a new and useful Improvement in Tide-Motors, of which the following is a specification.

Our invention relates to improvements in the construction of power-generating tide-motor apparatus actuated by the rising and falling movements of a heavily weighted float.

The apparatus may be employed to pump water into a storage reservoir to operate, for example, as a constant source of power for turning a water-wheel and, through the latter, operate other machinery, such as a dynamo, to generate electric energy for industrial purposes.

One of our main objects is to provide a tide-motor float with means for increasing its buoyancy during the rise of the tide and for increasing its effective weight during the fall of the tide with a view to enhancing its efficiency.

It is further our object to provide tide-motor apparatus of a particularly simple, compact and durable construction possessing great capacity for the generation of power.

In the embodiment of our invention illustrated in the accompanying drawings we provide a barge of suitably large proportions floating in a dock which is exposed to the open sea, whereby the barge will rise and fall with the tide and, if desired, be subject, in a slight measure, to the influence of waves. The barge is free to rise and fall, but is confined against longitudinal and lateral movement by stationary retaining guides or uprights in the dock. Mounted on the barge is a plurality of water-raising pumps; and the uprights, or a certain number thereof, are provided with racks which are engaged by pinions mounted on shafts upon the barge. In the rise and fall of the barge the pinions are turned by their engagement with the racks and, through speed-multiplying intermediate gears, operate the pumps.

Supported upon a frame overlying the dock is a series of pipes which communicate with an elevated reservoir. Flexible hose sections extend from the discharge ports of the pumps to the said pipes, whereby the water discharged by the pumps enters the said pipes and is raised therein to the reservoir. The water thus stored in the reservoir is led through a down-pipe to a turbine to actuate the same, the turbine being operatively connected, directly or otherwise, with the shaft of a dynamo at which electric energy may be generated for industrial purposes.

The sides and ends of the barge or float are water tight and extend approximately equidistant above and below the bottom or deck. An air and water-tight compartment, open at the under side, is thus formed beneath the deck and means are provided for causing this compartment to fill with air when the tide is out and the float is at its lowest level to enhance the buoyancy of the float while the tide is rising. Means are also provided for permitting the air to escape from the inclosed space or compartment beneath the deck as the float rises to its highest level, under the force of the incoming tide, and the said space to fill with water and increase the effective weight of the float as it descends under the action of the outgoing tide.

Figure 2:
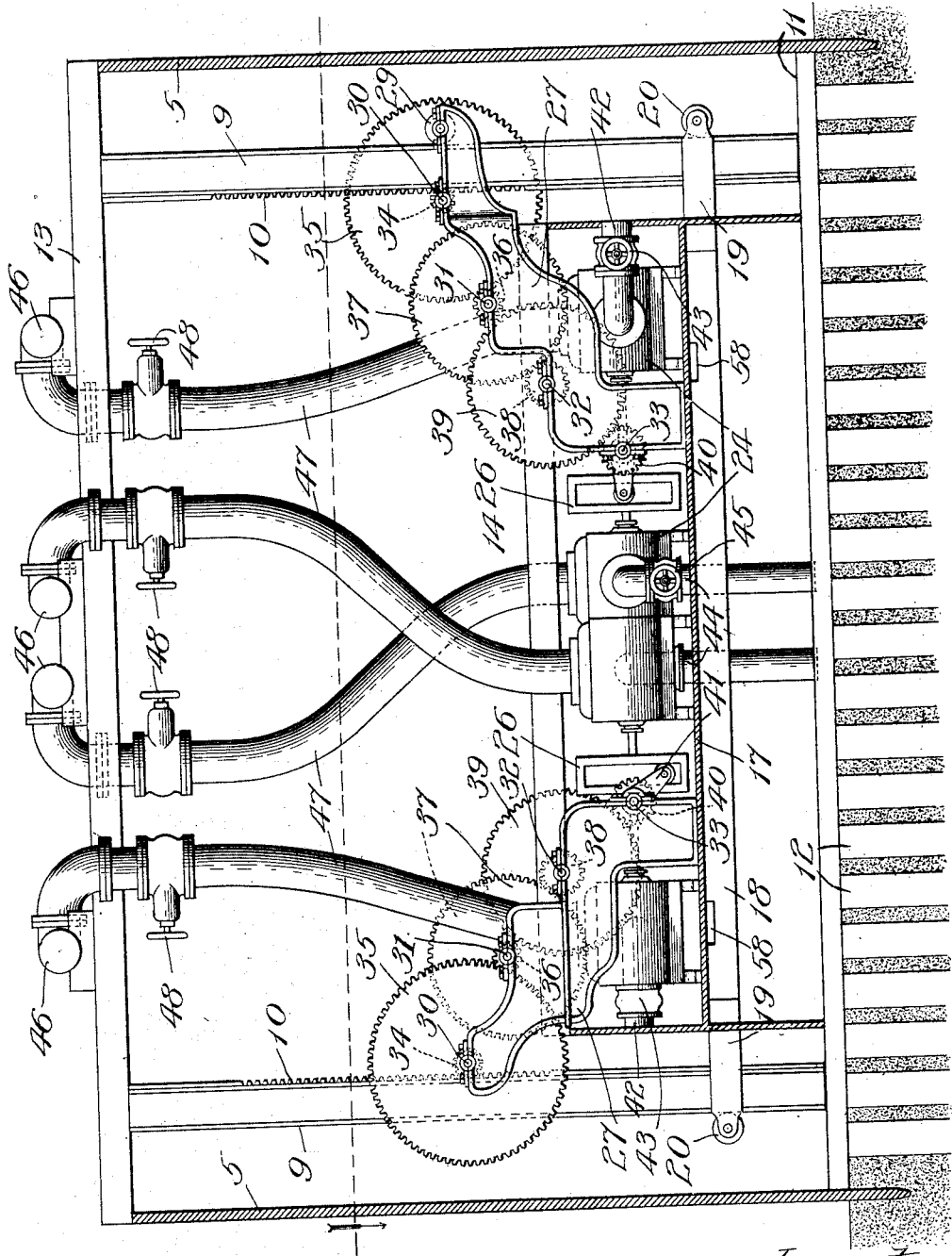
Figure 3:
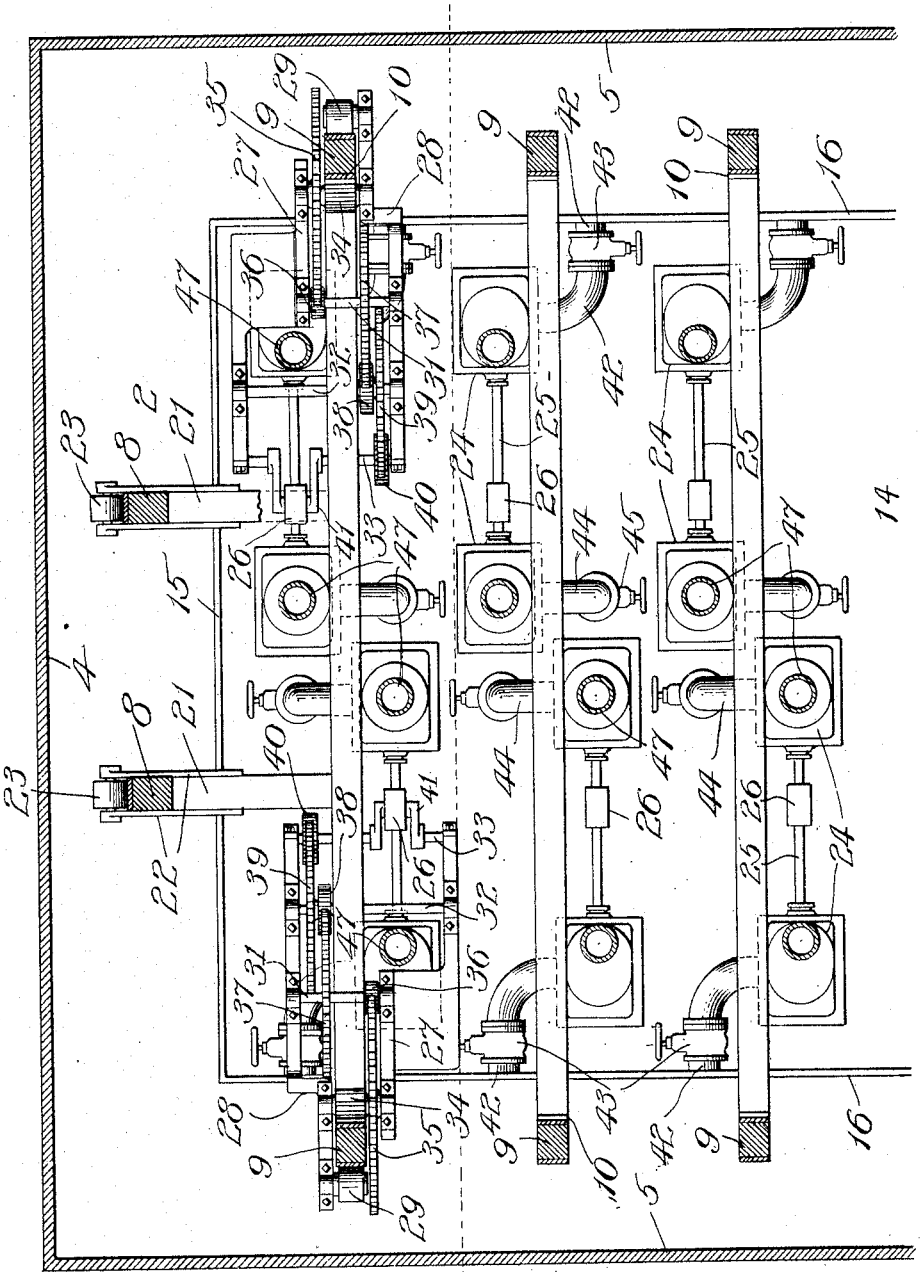
Figure 4:
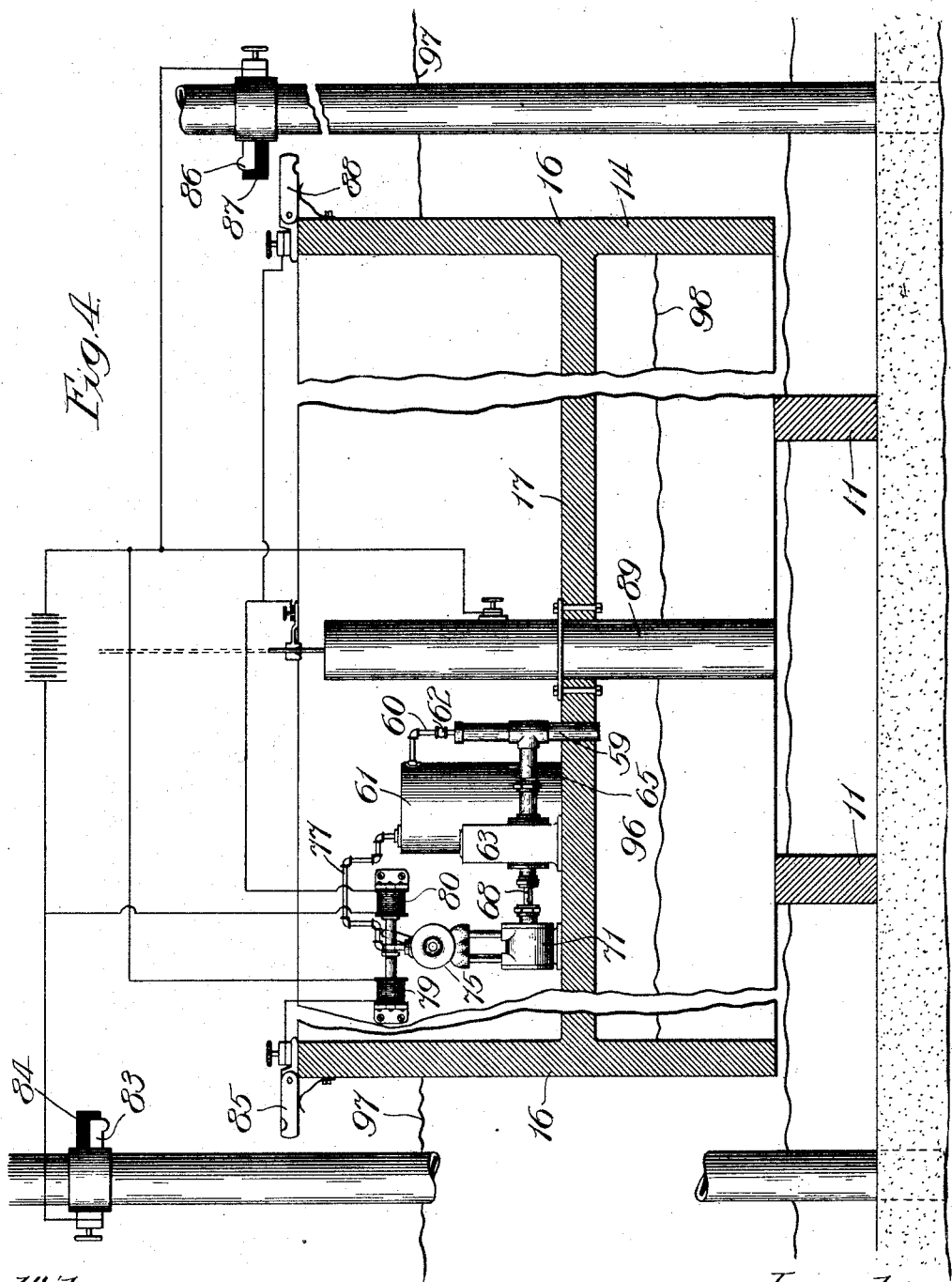

Referring to the drawings—Figure 1 is a broken section of a tide-motor plant; Fig. 2, an enlarged cross-section of the dock and barge, the section being taken on line 2 in Fig. 3 and viewed in the direction of the arrow; Fig. 3, a broken sectional plan view taken on line 3 in Fig. 2 showing one end portion of the barge, the actuating gears for all the pumps, except those at the end of the barge, being left out to avoid duplication; Fig. 4, a broken and enlarged section taken at the center of the barge and showing means for exhausting air from the space beneath the deck when the barge rises toward its highest level; Fig. 5, a further enlarged broken and sectional view of the said air-exhausting means, and Fig. 6, a broken vertical section illustrating float-mechanism with which the tube, or well, shown in Fig. 4, is equipped.

4 is the inner end wall and 5, 5 the side walls of a dock which may be open at its outer end to the sea.

7 and 7ᵃ in Fig. 1 represent, respectively, the low and high tide levels.

Near opposite ends of the dock are stationary posts or uprights 8, and adjacent to the side walls are parallel series of posts or uprights 9 having vertical racks 10 on their inner faces. The floor or base line of the dock may be slightly above the low tide level and formed of joists 11 supported upon piles 12 driven as indicated. The uprights 8 and 9 are secured to the floor, and at their tops support cross-beams 13.

14 is a barge or float having ends 15, sides 16 and a bottom or deck 17. The deck is approximately midway between the top and bottom of the sides and ends, the latter being air and water tight beneath the deck to form a compartment open at the bottom as indicated. Secured to the under side of the deck are cross-beams 18 provided at their ends with brackets, or the like, 19, carrying rollers 20 which ride against the outer shod surfaces of the uprights 9. Upper and lower longitudinally-extending beams 21 secured to and extending beyond the ends of the float carry brackets or stirrup-frames 22 embracing the uprights 8 and carrying rollers 23 which ride against the outer shod surfaces of the said uprights. The float is thus left free to rise and fall, but is held against lateral and longitudinal play by the engagement of the rollers 20, 23 with the uprights.

24, 24 are duplex water-raising pumps, each having two cylinders containing pistons which are connected to operate together by the common piston-rods 25. Each of the piston-rods 25 carries a yoke 26. A duplex pump 24 is mounted upon the deck adjacent to each of the uprights 9.

Fastened to the deck of the float and extending upward at opposite sides of each pump is a frame formed of two side cheeks 27 and 28. Each cheek 28 extends across one side and beyond the adjacent upright 9 and carries a roller 29 which rides upon the outer shod surface of the upright. The cheeks of each frame form bearings for short shafts 30, 31, 32 and 33 which are journaled thereon in the respective positions shown. Each shaft 30 carries a pinion 34, engaging the adjacent rack 10, and a large gear-wheel 35 meshing with a pinion 36 on the shaft 31. Also on the shaft 31 is a gear-wheel 37 meshing with a pinion 38 on the shaft 32. A gear-wheel 39 on the shaft 32 engages a pinion 40 on the shaft 33, and the latter shaft carries, or is formed with, a crank 41 passing through the adjacent yoke 26.

The outer cylinder of each pump 24 has an induction-pipe 42 extending through the adjacent side of the float and provided with a valve 43; while each of the inner pump cylinders has an induction-pipe 44 extending through the deck and provided with a valve 45. The pumps are so disposed upon the deck as to present two lines of inner pump cylinders and two lines of outer pump cylinders.

Supported upon the beams 13 and extending longitudinally over the float, directly above the lines of pump cylinders, are four water-conducting pipes 46. The eduction ports of the pump cylinders communicate with the pipes 46 through flexible hose-sections 47. Interposed between the pipes 46 and the hose-sections are valves 48. The flexible hose-sections permit the float to rise and fall while maintaining the connection between the eduction ports of the pump cylinders and the pipes 46. The latter lead to an elevated reservoir 49.

50 is a water-wheel or turbine having an outlet pipe 51 descending into a sump 52 which overflows through a duct 53 into the dock. A supply-pipe 54, communicating through branch pipes 55 with the reservoir, leads to the turbine or water-wheel 50; and directly connected with the shaft 56 of the latter is the armature of a dynamo 57.

The power capable of being exerted against the trains of gears to actuate the pumps in the descent of the float is naturally limited by the weight of the latter, while the power which can be exerted during the rise of the tide depends upon the buoyancy of the float. It is desirable that the float should occupy no more dock-room than necessary and that both its weight and its buoyancy shall be as great as possible consistent with its dimensions. During the descent of a float with the outgoing tide it must exert a power by reason of its weight somewhat in excess of the power necessary to actuate all the pumps through the trains of gears, and the buoyancy of the float should be capable of exerting an equal force during the rise of the tide. To provide a float having these attributes it has been necessary hitherto to construct it unduly large and thus provide a float capable of exerting greater power in one direction at least than can be utilized. Our object in the following construction is to overcome this difficulty and dispense with the increased installation cost which such a barge or float necessitates.

The beams 19 and 21 at the under side of the deck are provided with recesses 58 in their upper sides to avoid air-pockets, and extending through the deck about midway between the ends of the barge is a stand-pipe 59 approximately flush at its lower end with the under face of the deck. At its upper end the stand-pipe communicates through a pipe 60 with an air-reservoir or tank 61; and interposed in the pipe 60 is a check-valve 62.

63 is a casing having a vent-opening 64 to the atmosphere and communicating with a pipe 65 connecting with the stand-pipe 59. At the pipe 65 in the casing is a valve-seat 66 for a valve 67 on a stem 68 extending through a stuffing-box 69 in the casing. The stem at its end opposite the valve 67 carries a piston 70 working in a cylinder 71, the stem passing through a stuffing-box 72 in said cylinder. Pipes 73, 74 extend from opposite end portions of the cylinder to the casing 75 of a rotary valve 76. A pipe 77 extends from the air-reservoir or pressure-tank 61 to the valve-casing 75. The valve 76 is turned by means of a handle 78 to open communication between the pipe 77 and one end of the cylinder 71 while exhausting the other end of said cylinder; the handle 78 being actuated by solenoids 79, 80. As shown in Fig. 5, the solenoid-cores are directly opposed to each other and are connected by a bar 81 having stops or rollers 82 engaging the handle 78.

On a stationary part of the dock is an electrical contact 83 over which extends an insulating piece or hook 84; and on the float is a vertically swinging contact latch 85 movable into engagement with the contact 83 as the float nears the limit of its rise. Also on a stationary part of the dock is an electrical contact 86 provided on its under side with an insulating shield 87, said contact being in the path of a swinging electrical contact 88 carried by the float, the two contacts being adapted to engage during the descent of the float to the floor of the dock.

Extending through the deck near the center thereof is a tube or well 89 containing a float or piston 90 on a stem 91. The stem slides through a guide 92 forming one terminal of an electric circuit and has a stem extension 93, insulated from the stem 91 and sliding through a guide 94, forming another terminal of said circuit. Between the stem and stem-extension is an enlargement or contact 95 which, when the float or piston 90 rises to the position indicated by dotted lines, in Fig. 6, engages the contact 94 and closes the circuit.

The operation of the features shown in Figs. 4, 5 and 6 is as follows: With the outgoing tide the barge or float 14 descends until it rests against the bottom of the dock which is slightly above the low tide level. Here the float remains until all water escapes from the space 96 beneath the deck 17, and the said space fills with air. The electrical connections are such that when the contacts 88, 86 engage, the solenoid 80 is excited to turn the valve 76 to the position shown in Fig. 5, causing compressed air stored in the tank 61 to pass through the pipes 77, 73 and close the valve 67. As the tide commences to rise the air in the space 96 is compressed, some of it escaping through the check-valve 62 to the reservoir 61 to keep up the pressure in the latter. When the tide rises, say to the level 97 in Fig. 4 and the water in the space 96 rises to the level 98 in said figure, the barge or float ascends with the tide causing the pumps to be actuated as described. As the tide nears the limit of its rise the contact 85 engages the contact 83 closing the circuit through the solenoid 79, thereby turning the valve 76 to open the cylinder 71, through the pipe 73, to the atmosphere and open it, through the pipe 74, to the compressed-air reservoir 61, thereby causing the valve 67 to be opened. This action causes the air to escape from the space 96 through the stand-pipe 59, pipe 65, casing 63 and port 64 until all the air is expelled from beneath the deck. The barge or float will descend somewhat during this operation, but will thereafter rise until the tide reaches its limit, the swinging contact 85 passing the contact 83 and extending over the insulation 84. The rise of the water in the well 89 during the escape of air from beneath the deck, as described, causes the float or piston 90 to rise and close the circuit between the terminals 92, 94 which also has the effect of exciting the solenoid 80 and turning the valve 76 to the position indicated in Fig. 5, causing the valve 67 to be closed by pressure from the tank 61, as before described. The construction can be such that during the rise of the barge the compressed air will occupy a depth of, say, one foot and enhance the buoyancy of the float. In the case of a barge, say, thirty by sixty feet the venting of the air from the space and the filling thereof with water would add about sixty tons to the weight of the barge in descending, and this weight would continue until after the barge reaches the limit of its descent and the tide level drops below the under side of the barge.

Our improved means for automatically increasing the buoyancy of the float in its rise and the weight of the float in its descent may be applied to tide-motors generally, and is not to be limited to the construction of power-generating means shown and described. In the present construction there is necessarily a more or less prolonged pause in the movement of the float while the tide is changing, but by the use of storage batteries fed from the dynamo a continuous electrical supply may be obtained.

It is to be understood that so far as details of construction and combination of parts are concerned, our invention may be variously modified without departing from the spirit thereof defined by the claims.

What we claim as new, and desire to secure by Letters Patent, is—

1. In a tide-motor, a power-generating float having a deck, an air-tight compartment beneath the deck open at its under side to the water, means operating, when the float is lowered and the tide falls, to charge said compartment with air, an air-vent valve for said compartment, and means actuated by the rise of the float to a predetermined height to open said valve, for the purpose set forth.

2. In a tide-motor, a power-generating float having a deck, an air-tight compartment beneath the deck open at its under side to the water, means operating, when the float is lowered and the tide falls, to charge said compartment with air, an air-vent valve for said compartment, means actuated by the rise of the float to a predetermined height to open said valve, and means operating to close said valve when the air has escaped from said compartment.

3. In a tide-motor, a power-generating float having a deck, an air-tight compartment beneath the deck open at its under side to the water, means operating, when the float is lowered and the tide falls, to charge said compartment with air, an air-vent valve for said compartment, means actuated by the rise of the float to a predetermined height to open said valve, and closing mechanism for said valve actuated by the rise of water in said compartment upon the escape of the air.

4. In a tide-motor, a power-generating float having a deck, an air-tight compartment beneath the deck open at its under side to the water, means operating, when the float is lowered and the tide falls, to charge said compartment with air, an air-vent valve for said compartment, an air-pressure tank, a pipe extending from said compartment to said tank, a check-valve in said pipe, a cylinder, a piston in the cylinder controlling said air-vent valve, means actuated by the rise of the float, to a predetermined height, to direct air-pressure from said tank to said cylinder at one side of the piston to open said vent-valve, and means operated by the rise of water in said compartment upon the escape of the air to direct pressure from said tank to said cylinder against the piston to close said vent-valve, substantially as and for the purpose set forth.

ELIEL L. SHARPNECK.
MATTHEW C. SHARPNECK.

In presence of—
CHARLES C. DASEY,
THOMAS C. LEANENS.